US008146980B2

(12) United States Patent
Takeuchi et al.

(10) Patent No.: US 8,146,980 B2
(45) Date of Patent: Apr. 3, 2012

(54) VEHICLE SUNSHADE DEVICE

(75) Inventors: Kouichi Takeuchi, Okazaki (JP);
Yoshitaka Joukaku, Aichi-ken (JP);
Daisaku Katou, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 98 days.

(21) Appl. No.: 12/502,595

(22) Filed: Jul. 14, 2009

(65) Prior Publication Data
US 2010/0013261 A1    Jan. 21, 2010

(30) Foreign Application Priority Data
Jul. 15, 2008   (JP) ................................. 2008-184123

(51) Int. Cl.
*B60J 3/02* (2006.01)
(52) U.S. Cl. .................. 296/97.4; 296/97.8; 160/370.22
(58) Field of Classification Search ................. 296/97.4, 296/97.8; 160/240, 323.1, 324, 325, 326, 160/DIG. 2, 370.22
See application file for complete search history.

(56) References Cited

U.S. PATENT DOCUMENTS

| | | | |
|---|---|---|---|
| 6,547,307 B2* | 4/2003 | Schlecht et al. | 296/97.4 |
| 6,598,929 B2* | 7/2003 | Schlecht et al. | 296/97.4 |
| 6,840,562 B2* | 1/2005 | Schlecht et al. | 296/97.9 |
| 6,983,786 B2* | 1/2006 | Chen | 160/370.22 |
| 7,140,662 B1* | 11/2006 | Wilkinson et al. | 296/97.4 |
| 7,314,079 B2* | 1/2008 | Yano et al. | 160/370.22 |
| 7,396,067 B2* | 7/2008 | Thumm et al. | 296/143 |
| 2002/0074824 A1 | 6/2002 | Schlecht et al. | |
| 2009/0072574 A1 | 3/2009 | Tominaga et al. | |
| 2009/0178771 A1* | 7/2009 | Lin | 160/370.22 |
| 2009/0195034 A1* | 8/2009 | Lin | 296/216.01 |

FOREIGN PATENT DOCUMENTS

| | | |
|---|---|---|
| JP | 2002-225566 | 8/2002 |
| JP | 2007-91224 | 4/2007 |

OTHER PUBLICATIONS

English language Abstract of JP2007-91224, Apr. 12, 2007.
English language Abstract of 2002-225566, Aug. 14, 2002.

* cited by examiner

*Primary Examiner* — Jason S Morrow
(74) *Attorney, Agent, or Firm* — Greenblum & Bernstein, P.L.C.

(57) ABSTRACT

The present invention relates to a vehicle sunshade device 20, which can cover and uncover a rear window provided between a pair of rear pillars 11R and 11L formed in both sides in the vehicle width direction with a screen body 21, and comprising: a winding device 30 for biasing the screen body 21 in its winding-up direction; a pair of guide rails 40R and 40L in both sides in the vehicle width direction of the winding device 30, and capable of being attached to the inner wall of the rear pillar; a pair of sliders 50 fixed at both edges in the vehicle width direction of the screen body 21 respectively, and capable of reciprocately moving within the pair of guide rails 40R and 40L; a drive unit 60 for reciprocately moving the sliders 50 within the guide rails 40R and 40L so as to spread out the screen body 21 against the biasing force of the winding device 30 and wind up the screen body 21 in a spread-out state with the winding device; a temporary joint part 80 for temporarily connecting the pair of guide rails 40R and 40L with the winding device 30 in a condition, where a relative distance between each of the guide rails 40R and 40L is adjustable, until the present vehicle sunshade device 20 is attached to the pair of rear pillars 11R and 11L.

7 Claims, 15 Drawing Sheets

VEHICLE SUNSHADE DEVICE

CROSS REFERENCE TO RELATED APPLICATION

This application claims priority from Japanese Patent Application No. 2008-184123 filed on Jul. 15, 2008. The entire content of this priority application is incorporated herein by reference.

TECHNICAL FIELD

The present disclosure relates to a vehicle sunshade device.

BACKGROUND

Conventionally, a vehicle sunshade device has been well-known, which spreads out a screen body wound on a winding device along a guide rail by the motion of a drive unit and covers a rear window so that the sun rays can be blocked. For example, Japanese Unexamined Patent Publication No. 2007-91224 has disclosed a vehicle sunshade device, in which such as a apart of the guide rail, the winding shaft, and the bearing base for supporting the winding shaft are interconnected by a frame pipe so as to be unitized. This allows the vehicle assembly line to conduct the assembly of the vehicle sunshade device to a vehicle on a unit-by unit basis. Accordingly, the workability can be improved as compared to a case where an each part composing the vehicle sunshade device is separately assembled to a vehicle, and thereby obtaining a constant effect (improved workability).

As an example of the above-mentioned assembly of the vehicle sunshade device to a vehicle, there has been a constitution in which guide rails are oppositely fixed between the inner walls of the right and left rear pillars. In such an assembly structure, when the right and left guide rails and the winding device are previously interconnected as one unit, the vehicle sunshade device can be assembled collectively to a vehicle, and thus the fitting workability is improved. However, there may be a case where the distance between the inner surfaces in the rear pillar side is narrower than a designed value due to such as a tilted shape of the rear pillar. And in such cases, where the distance between the inner surfaces in the rear pillar side (a size L1 in FIG. 6) is narrower than the distance between the outer surfaces in the guide rail side (a size L2 in FIG. 6), fixedly connecting the right and left guide rails with the winding device causes the interference between the rear pillar and the guide rail, and the fitting cannot therefore be performed. This invention has been completed based on the above circumstances, and its purpose is to provide a vehicle sunshade device which has excellent workability in fitting to a vehicle.

SUMMARY

The present invention relates to a vehicle sunshade device, which can cover and uncover a rear window provided between a pair of rear pillars formed in both sides in the vehicle width direction with a screen body, and comprising: a winding device for biasing the screen body in its winding-up direction; a pair of guide rails in both sides in the vehicle width direction of the winding device, and capable of being attached to the inner wall of the rear pillar; a pair of sliders fixed at both edges in the vehicle width direction of the screen body respectively, and capable of reciprocately moving within the pair of guide rails; a drive unit for reciprocately moving the sliders within the guide rails so as to spread out the screen body against the biasing force of the winding device and wind up the screen body in a spread-out state with the winding device; a temporary joint part for temporarily connecting the pair of guide rails with the winding device in a condition, where a relative distance between each of the guide rails is adjustable, until the present vehicle sunshade device is attached to the pair of rear pillars.

The vehicle sunshade device according to the present invention comprises a temporary joint part for temporarily connecting the guide rails with the winding device. Therefore, both guide rails and the winding device in a collected-state can be fitted between the right and left rear pillars, and thereby improving the fitting workability. Furthermore, this temporary joint part temporarily connects both guide rails with the winding device in a condition where a relative distance between the guide rails is adjustable. Therefore, even when the distance between the inner surfaces in the rear pillar side (a size L1 in FIG. 6) is narrower than the distance between the outer surfaces in the guide rail side (a size L2 in FIG. 6) due to such as a tilted shape of the rear pillar, the distance between the outer surfaces in the guide rail side can be narrowed in accordance with the distance between the inner surfaces in the rear pillar side, and thus, the guide rail can be mounted to the inner wall of the rear pillar with no difficulty.

BRIEF DESCRIPTION OF THE DRAWINGS

Illustrative aspects in accordance with the invention will be described in detail with reference to the following figures wherein.

DETAILED DESCRIPTION OF THE PREFERRED ILLUSTRATIVE ASPECTS

Aspect 1

Figure 1:
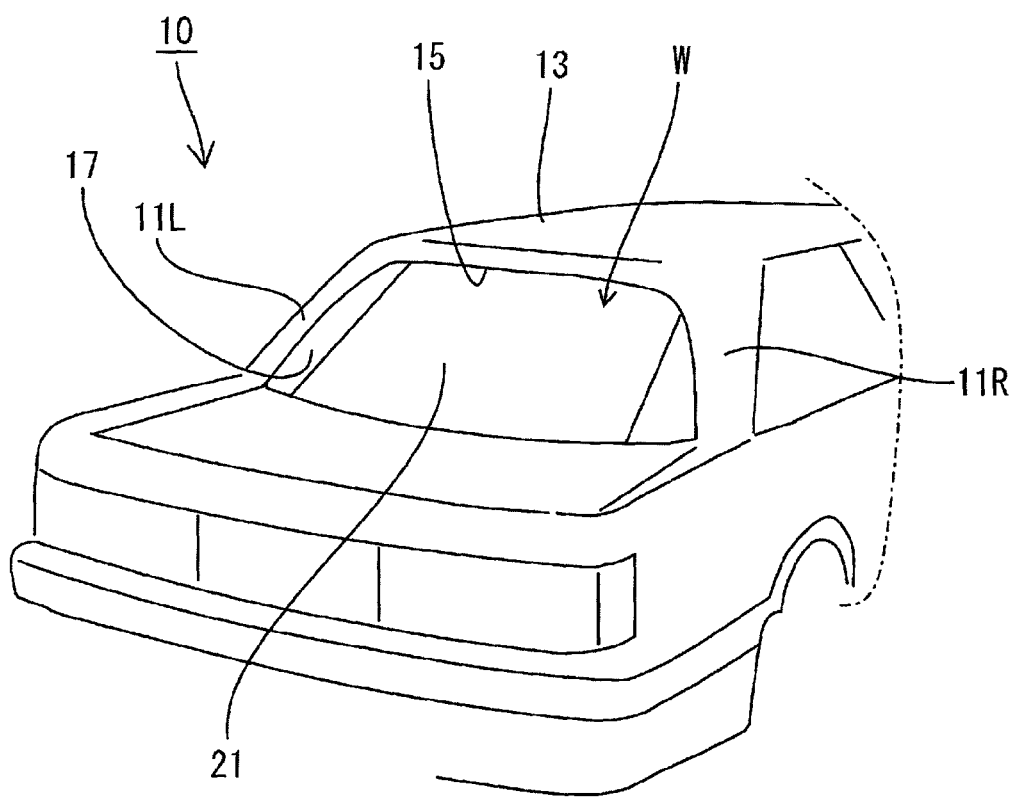
FIG. 1 shows a vehicle, to which Aspect 1 according to the present invention is applied, viewed from the rear side.

As referring now to FIGS. 1 to 8, Aspect 1 of the present invention is described. FIG. 1 is a perspective view of a vehicle 10, viewed from the rear side. 11R and 11L in FIG. 1 refer to rear pillars. These rear pillars 11R and 11L along with a roof 13 are composing a window frame 15, and a rear window glass 17 is fitted therein.

The vehicle 10 is mounted with a vehicle sunshade device 20 described in the following, and can cover a rear window W (what the rear window glass 17 is attached to the window frame) with a sheet-shaped screen body 21 from the compartment side. This can block the sun rays coming through the rear window into the compartment.

Figure 2:
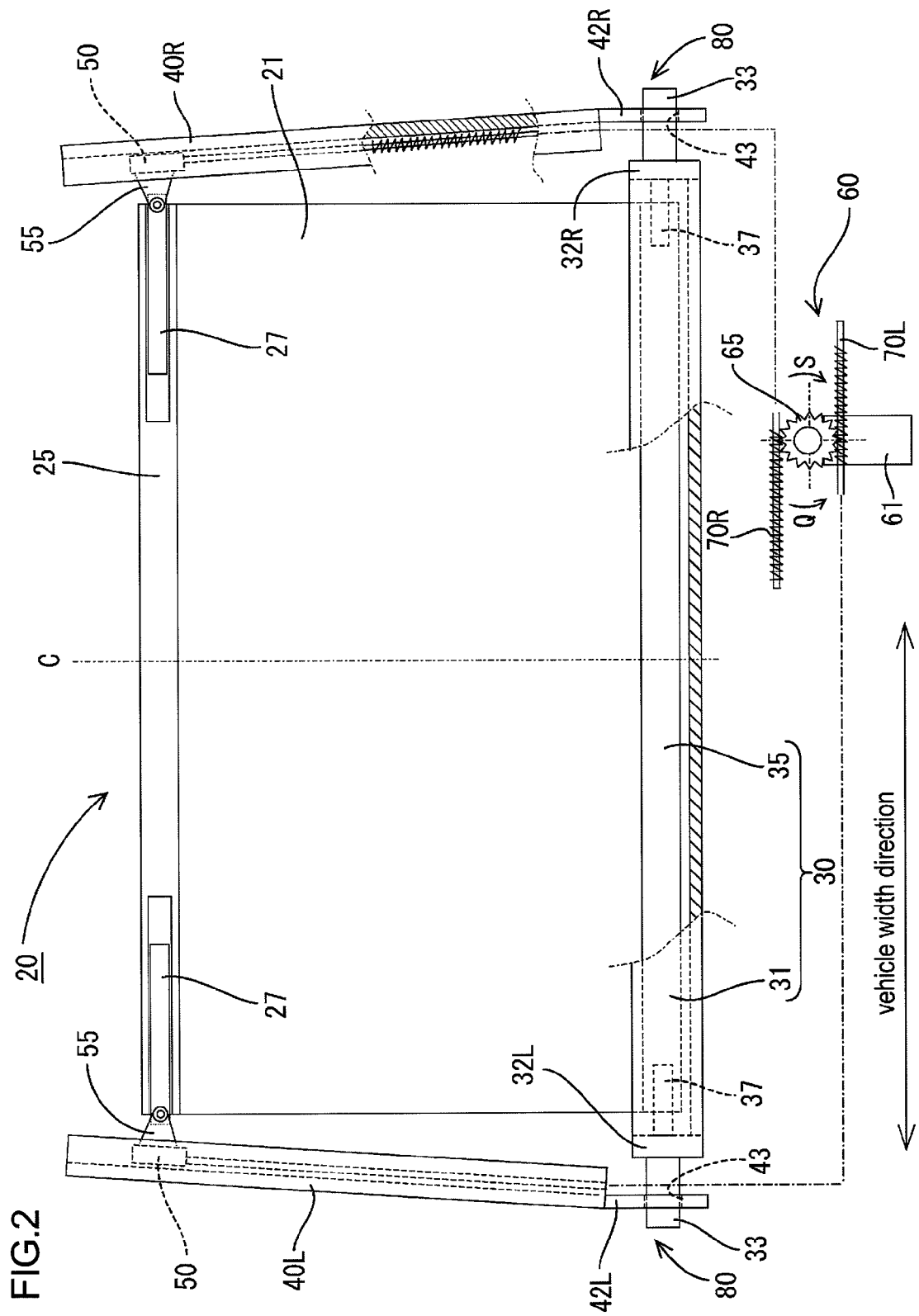
FIG. 2 is an elevation view of a vehicle sunshade device.

The configuration of the vehicle sunshade device 20 is as shown in FIG. 2, and comprises a screen body 21, a winding device 30, a pair of guide rails 40R and 40L, a pair of sliders 50, a drive unit 60, and a temporary joint part 80.

Sequentially explained, the screen body 21 has a size capable of covering the rear window W. This screen body 21 is composed of a sheet material having a surface color that easily absorbs light such as, for example, black. Attached to the edge of the screen body 21 is a plate-like edge frame 25 for spreading the screen body 21 in the width direction. The edge frame 25 is made of, for example, a synthetic resin, and its both sides are attached with a movable piece 27 capable of sliding motion in the vehicle width direction. These movable pieces 27 are constituted so as to join with the after-mentioned slider 50 respectively via a connector 55.

The winding device 30 has a winding shaft 35 housed inside a casing (corresponding to "supporting member" in the present invention) 31. The casing 31 is made of, for example, a metal and has a box-shape elongated in the vehicle width direction (the right and leftward in FIG. 2), with its upper surface opened as a door way for allowing the screen body 21 to enter or leave. This casing 31 is provided with wall surfaces 32R and 32L in its both sides in the vehicle width direction. The winding shaft 35 is housed inside the casing 31 in a manner so as to have its shaft coincided with that of the casing 31 in the longitudinal direction. In addition, as shown in FIG. 2, the inner surface side of each wall surface 32R and 32L of the casing 31 is provided respectively with a bearing member 37, so that each bearing member 37 bears each shaft end of the winding shaft 35. Accordingly, the winding shaft 35 is constituted so as to be rotatable about the axis within the casing 31. In what follows, the wall surfaces 32R and 32L of the casing 31 are referred to respectively as the second wall surfaces 32R 32L.

The winding shaft 35 has a built-in rotary winding mechanism (drawing abbreviated), that is composed of such as springs, while the base end of the screen body 21 is fixed on the circumference of the winding shaft 35, so that a biasing force in the winding direction constantly works on the screen body 21.

Figure 3:
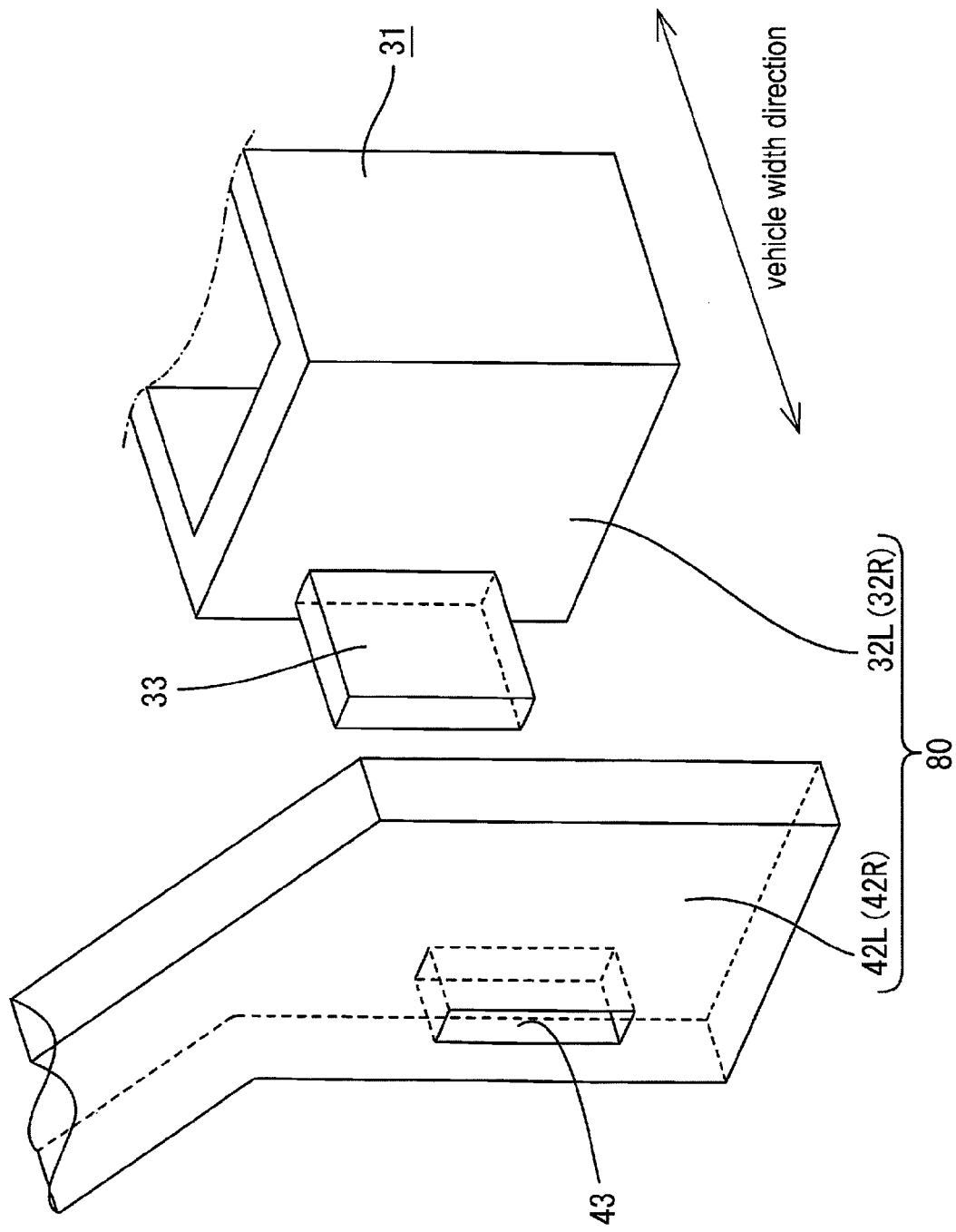
FIG. 3 is a perspective view showing a structure of a temporary joint part.

In addition, in the outer surface side of both the second wall surfaces 32R and 32L, as shown in FIG. 3, an insertion shaft 33 is integrally formed as horizontally extending in the vehicle width direction. The insertion shaft 33 is provided in a position closer to the front end of the second wall surfaces 32R and 32L, and its cross-section is in a rectangular shape (in particular, a rectangle that is long in vertical direction).

Returning to FIG. 2, both guide rails 40R and 40L are made of, for example, a metal and have a vertically long shape, extending along the rear pillars 11R and 11L. These guide rails 4OR and 40L as a whole are slightly inclined to the inner side in the vehicle width direction, following the shape of the rear pillars 11R and 11L (the upper side is more inclined to the center of the vehicle). Additionally, the center line of the vehicle is indicated with C in FIG. 2. These guide rails 40R and 40L have their inner surfaces in the inner side of the vehicle opened, and the slider 50 is respectively and movably interfitted therein.

Figure 4:
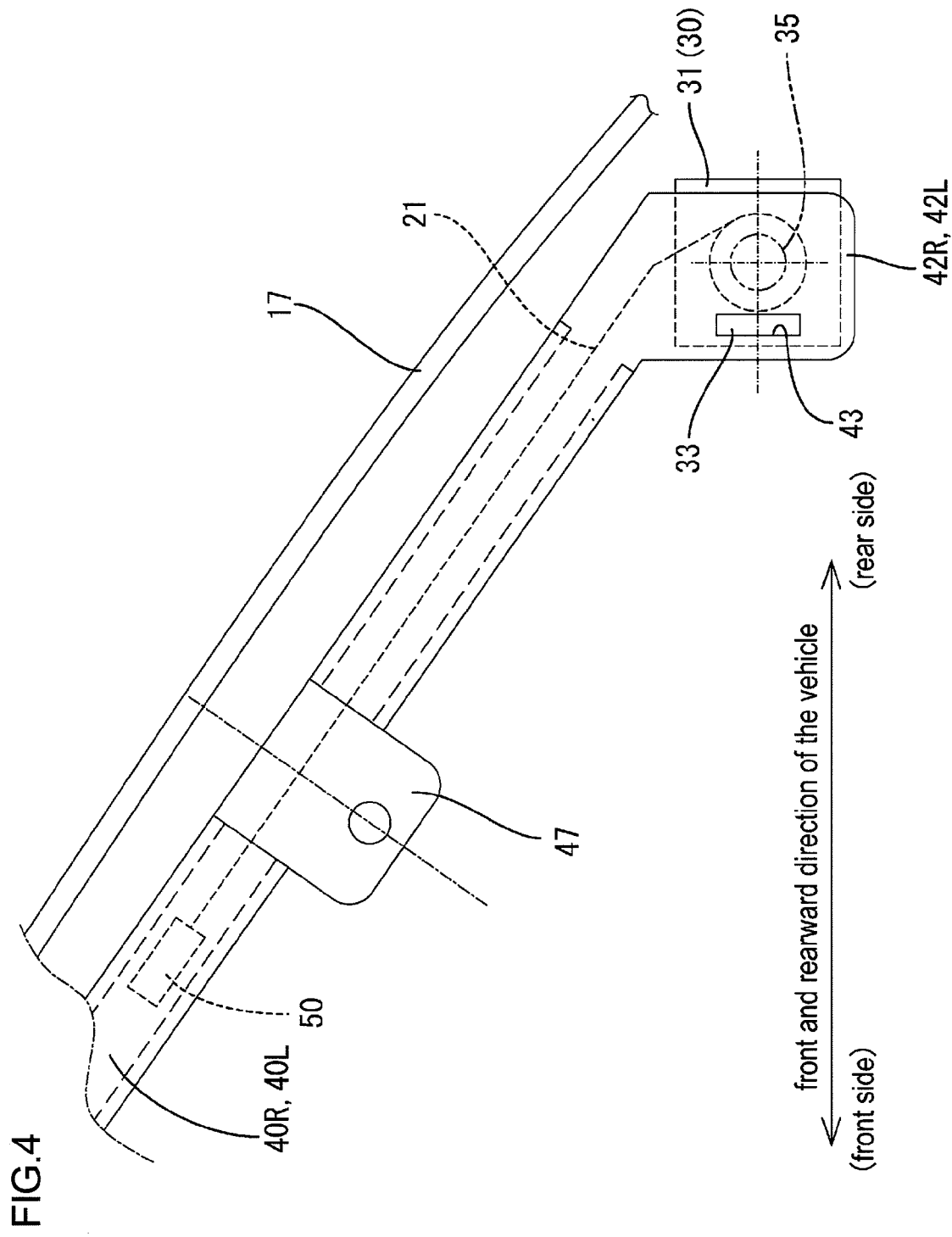
FIG. 4 is a side view showing a state of the vehicle sunshade device mounted to a vehicle.

The first wall surfaces 42R and 42L are integrally formed in the lower part of the guide rails 40R and 40L. These first wall surfaces 42R and 42L are, as shown in FIG. 4, in a size so as to generally overlap the casing 31 of the winding device 30 when viewed from the side surface direction (viewed from the direction orthogonal to the paper surface of the figure). Each first wall surface 42R and 42L is composing the temporary joint part 80 together with each second wall surface 32R and 32L provided with the insertion shaft 33. In concrete, a through-hole 43 is formed respectively in the first wall surfaces 42R and 42L as corresponding to the insertion shaft 33 formed in each second wall surface 32R and 32L of the casing 31.

The through-hole 43 according to the present aspect penetrates through each first wall surface 42R and 42L in the vehicle width direction, and its hole shape is rectangular (a rectangle shape that allows the insertion shaft to be inserted).

Accordingly, the insertion shaft 33 in the second wall surface 32L of the casing 31 is inserted into the through-hole 43 in the first wall surface 42L, so that the left guide rail 40L can be temporarily connected to the left end of the casing 31. And also, the insertion shaft 33 in the second wall surface 32R of the casing 31 is inserted into the through-hole 43 in the first wall surface 42R, so that the right guide rail 40R can be temporarily connected to the right end of the casing 31. As mentioned above, the temporary joint part 80 is constituted so as to temporarily connect the left guide rail 40L to the casing 31 by the first wall surface 42L having the through-hole 43 and the second wall surface 32L having the insertion shaft 33. And also, the temporary joint part 80 is constituted so as to temporarily connect the right guide rail 40R to the casing 31 by the first wall surface 42R having the through-hole 43 and the second wall surface 32R having the insertion shaft 33.

Here, each insertion shaft 33 is constituted so as to be inserted into the corresponding through-hole 43 with a certain clearance therebetween. Both the right and left guide rails 40R and 40L can therefore move freely in the vehicle width direction along the insertion shaft 33 even after the temporary connection, and thus, the relative distance between both guide rails 40R and 40L (the relative distance in the vehicle width direction) can be adjusted accordingly. In addition, the length of the insertion shaft 33 in the vehicle width direction is adopted to be slightly longer so as not to fall out of the through-hole 43 when adjusting the relative distance between both the guide rails 40R and 40L. As shown in FIG. 2, the length of the insertion shaft 33 normally has a size so that the tip of the insertion shaft 33 penetrates through the through-hole 43 and protrudes outwardly from the first wall surfaces 42R and 42L.

The hole shape of the through-hole 43 as well as the cross-sectional shape of the insertion shaft 33 have an angular shape (in concrete, a rectangular shape), and both the guide rails 40R and 40L are therefore in a rotation preventive state prevented by the casing 31 of the winding device 30 after the insertion, and thereby holding the relative positional relationship maintained.

Figure 5:
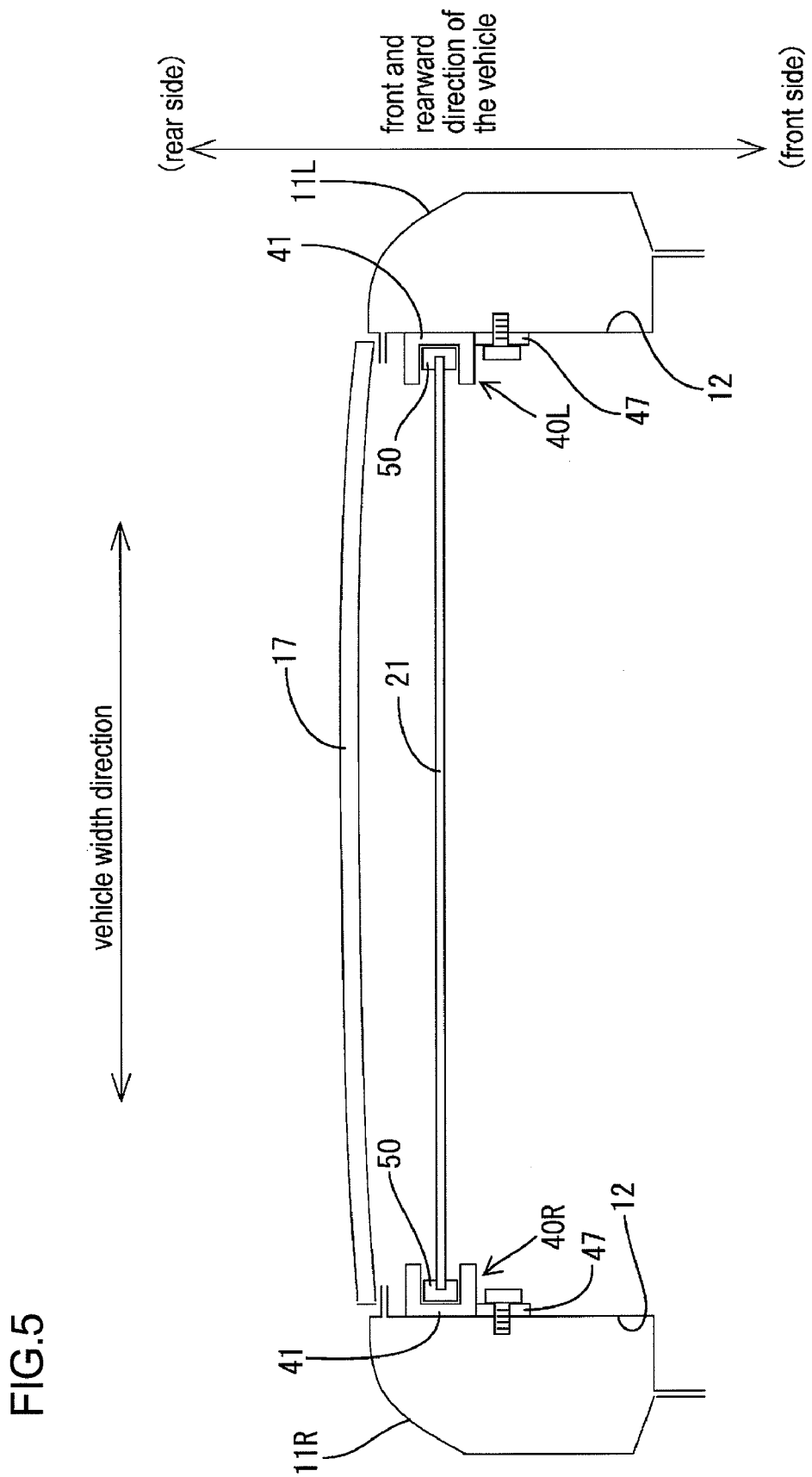
FIG. 5 is a pattern diagram showing an assembly structure of the vehicle sunshade device to rear pillars.

Formed in each the above-mentioned guide rail 40R and 40L along the longitudinal direction as shown in FIG. 4 is a plurality of mounting brackets 47 (one in the present figure), and these guide rails 40R and 40L are, as shown in FIG. 5, adopted so as to fit to an inner surface wall 12 in each rear pillar 11R and 11L by bolting, with their openings opposed each other at the time of the assembly to a vehicle.

Next, the slider 50 is explained. The slider 50 is made of, for example, a synthetic resin, and movable within the guide rails 40R and 40L. As shown in FIG. 2, the slider 50 fitted in the left guide rail 40L is joined with the movable piece 27 attached to the left side of the edge frame 25 via the connector 55. Also, the slider 50 fitted in the right guide rail 40R is joined with the movable piece 27 attached to the right side of the edge frame 25 via the connector 55. Both the sliders 50 are constituted so as to move synchronously and respectively within each guide rail 40R and 40L due to the motion of the after-mentioned drive unit 60, reciprocating between the lower end of the rail to the upper end of the rail.

The drive unit 60 is composed of such as a motor 61, an output gear 65 connected to a motor shaft, and relay cables 70R and 70L. The relay cables 70R and 70L are made of a deflectable metal made wire rod, and have spiral teeth formed in their outer circumferences which are capable of engaging with the output gear 65. In Aspect 1, two relay cables 70R and 70L are comprised for corresponding to two sliders 50, and the tip of each relay cable 70R and 70L is fixed to each slider 50.

In addition, the relay cable 70L connected with the slider 50 in the left guide rail 40L is engaged with the output gear 65 at the lower part thereof, while the relay cable 70R connected with the slider 50 in the right guide rail 40R is engaged with the output gear 65 at the upper part thereof.

According to the above configuration, when the output gear 65 is rotated in the normal rotation direction (a direction S in FIG. 2) by the operation of energizing the motor 61, both relay cables 70R and 70L are simultaneously veered out so that each slider 50 moves within each guide rail 40R and 40L from the lower end side of the rail to the upper end side thereof. This allows both the moving sliders 50 to bring the edge frame 25 up, causing the screen body 21 to be pulled out from the winding device 30 and spread out. Consequently, the rear window W can be covered by the screen body 21.

On the other hand, when the output gear 65 is rotated in the reverse direction (a direction Q in FIG. 2), both relay cables 70R and 70L in a veered state are simultaneously taken back so that each slider 50 moves within each guide rail 40R and 40L from the upper end side of the rail to the lower end side thereof. This allows the screen body 21 in a spread state to be wound up by the winding device 30, and thereby uncovering the rear window W. As mentioned above, the rear window W is constituted so as to be covered and uncovered by the screen body 21.

In addition, when both the right and left sliders 50 move up and down along the guide rails 40R and 40L, the relative distance between both sliders 50 in the vehicle width direction becomes wider and narrower, however, following this, both the movable pieces 27 provided in both sides of the edge frame 25 slide in the vehicle width direction, so as to absorb the change of the relative distance.

Next, the assembly procedure of the vehicle sunshade device 20 is explained. First of all, the vehicle sunshade device 20 is temporarily assembled in a state shown in FIG. 2 at the place other than a vehicle assembly line.

Steps for the assembly is firstly to insert each insertion shaft 33 of the casing 31 into each through-hole 43 in the guide rails 40R and 40L. This allows the right and left guide rails 40R and 40L to be temporarily and respectively connected to the right and left shaft ends of the casing 31. After this temporary connection, the screen body 21 is pulled out from the winding device 30 for a certain amount, and then the slider 50 in each guide rail 40R and 40L may be respectively fixed to the right and left movable pieces 27 of the pulled-out screen body 21 via the connector 55. This enables the vehicle sunshade device 20 to be temporarily assembled.

Figure 6:
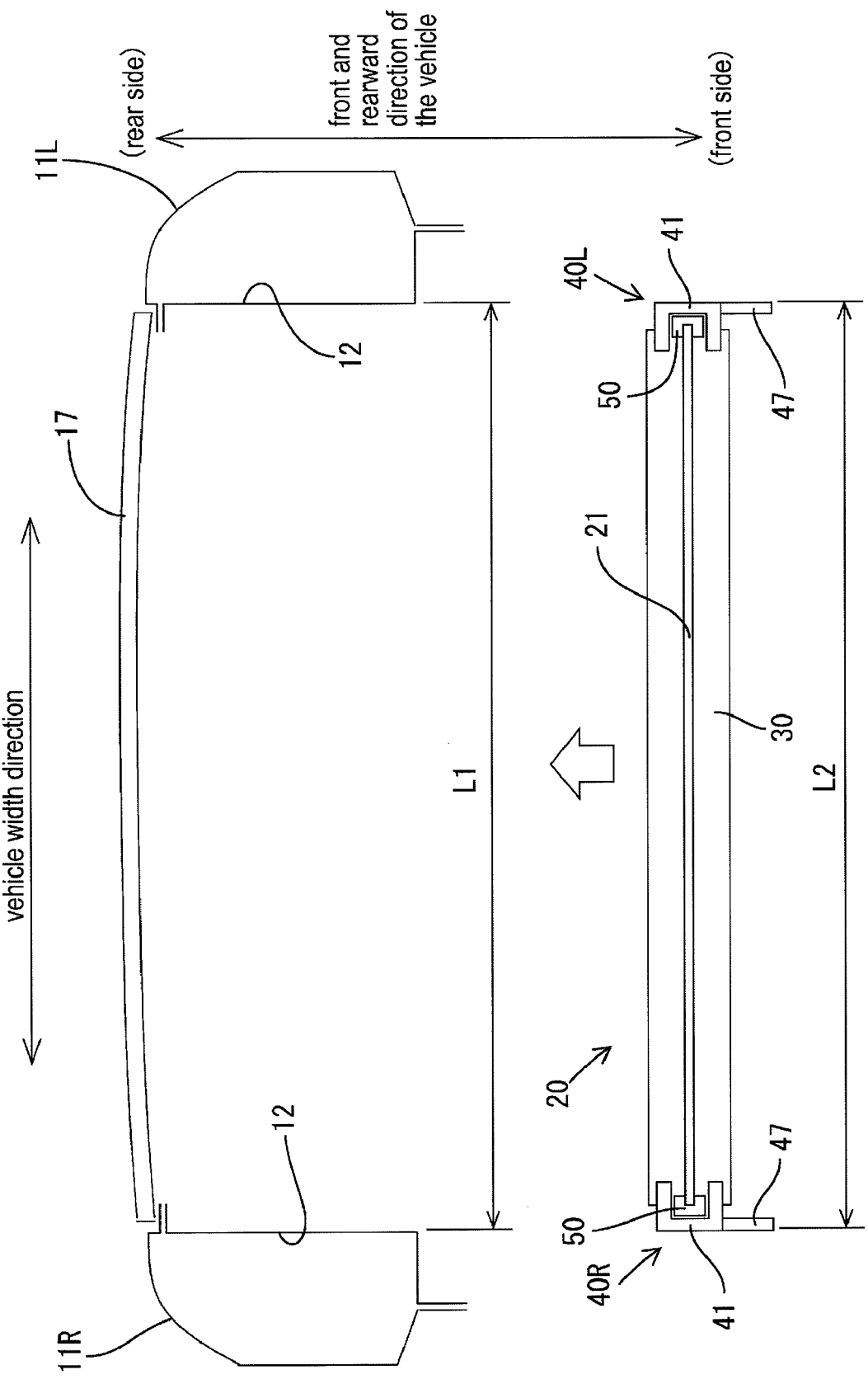
FIG. 6 is a pattern diagram showing an assembly procedure of the vehicle sunshade device to a vehicle.

The temporarily-assembled vehicle sunshade devices 20 are delivered to the vehicle assembly line in a plurality of sets. Then, the delivered vehicle sunshade device 20 still in a temporarily-assembled state is assembled into a car body of the vehicle running on the line by each set. In concrete, the temporarily assembled vehicle sunshade device 20 is firstly, as shown in FIG. 6, set in a position in front of the rear pillars 11R and 11L with the right and left guide rails 40R and 40L opposed each other in the vehicle width direction, and then from this state, is entirely fitted between the right and left rear pillars 11R and 11L.

This causes the outer surface wall 41 of each guide rail 40R and 40L and the mounting bracket 47 to be overlapped one after another on each inner surface wall 12 of the right and left rear pillars 11R and 11L.

After that, the tightening work for bolting the mounting bracket 47 to the inner surface wall 12 of each right and left rear pillar 11R and 11L is conducted. This enables the right and left guide rails 40R and 40L to be fixed respectively to the inner surface wall 12 of each right and left rear pillar 11R and 11L (see FIG. 5). After that, as needed, the drive unit 60 and the winding device 30 are fixed to the car body, and thereby completing the assembly of the vehicle sunshade device 20 into a car body. Additionally, at the time of this mounting of the vehicle sunshade device 20 into a vehicle, the winding device 30 is positioned, for example, down below the right and left rear pillars 11R and 11L, so that the tips of the insertion shaft 33 protruding in the vehicle width direction do not interfere with the inner surface walls 12 of the rear pillars 11R and 11L.

As mentioned, in Aspect 1, the vehicle sunshade device 20 is previously and temporarily assembled so that the entire vehicle sunshade device 20 can be assembled altogether to a car body, and thereby achieving excellent fitting workability.

Furthermore, even though the right and left guide rails 40R and 40L are in a temporarily-assembled state, the relative distance between the guide rails can be adjusted by the movement of the vehicle sunshade device 20 in the vehicle width direction relative to the winding device 30. Therefore, even though the distance between the inner surfaces L1 in the rear pillar side (the distance between the inner surface walls 12) is narrower than the distance between the outer surfaces L2 in the side of the guide rails 40R and 40L (the distance between the outer surface walls 41) due to such as the tilt of the rear pillars 11R and 11L, the distance between the outer surfaces L2 in the side of the guide rails 40R and 40L can be narrowed in accordance with the distance between the inner surfaces L1 in the side of the rear pillars 11R and 11L. In such case, the entire vehicle sunshade device 20 in a temporarily-assembled state can also be accordingly fitted between the rear pillars 11R and 11L.

In some cases, the distance between the inner surfaces L1 in the side of the rear pillars 11R and 11L may be wider than the distance between the outer surfaces L2 in the side of the guide rails 40R and 40L. If so, the distance between the outer surfaces L2 in the side of the guide rails 40R and 40L may be widened in accordance with the distance between the inner surfaces L1 in the side of the rear pillars, so that the vehicle sunshade device 20 can be fitted between the rear pillars 11R and 11L without a clearance. Consequently, each guide rail 40R and 40L can be rigidly fixed to each inner surface wall 12 of the rear pillars 11R and 11L.

According to Aspect 1, as mentioned, the relative distance between the guide rails 40R and 40L (the relative distance in the vehicle width direction) may be accordingly adjusted even in a temporarily-assembled state of the vehicle sunshade device 20. Even when there is a size gap between the distance between the inner surfaces L1 in the side of the rear pillars 1R and 11L and the distance between the outer surfaces L2 in the side of the guide rails 40R and 40L, the vehicle sunshade device 20 can therefore be fitted between both the rear pillars 11R and 11L without difficulties, and thereby achieving excellent fitting workability.

According to Aspect 1, the temporary joint part 80, that enables the adjustment of the relative distance between the guide rails 40R and 40L, is composed of the first wall surfaces 42R and 43L having the through-hole 43 and the second wall surfaces 32R and 32L having the insertion shaft 33. According to such a configuration, the temporary joint part 80 can be constituted in a very simple manner without increase in the number of parts, and is therefore effective for the cost performance.

Additionally, both the hole shape of the through-hole 43 and the cross-sectional shape of the insertion shaft 33 are multiangular (in particular, rectangular) in Aspect 1. Thus, both the right and left guide rails 40R and 40L are fixed in a rotation preventive state prevented by the casing 31 of the winding device 30 when temporarily assembling the sunshade device 20. Accordingly, no displacement of the relative position between the guide rails 40R and 40L occurs when they are fixed to the rear pillars 11R and 11L (as illustrated in FIG. 4, when viewed from the side surface direction, both rails 40R and 40L come in an overlapped state). Consequently, the screen body 21 is stretched neatly when spread out, looking excellent.

Figure 7:
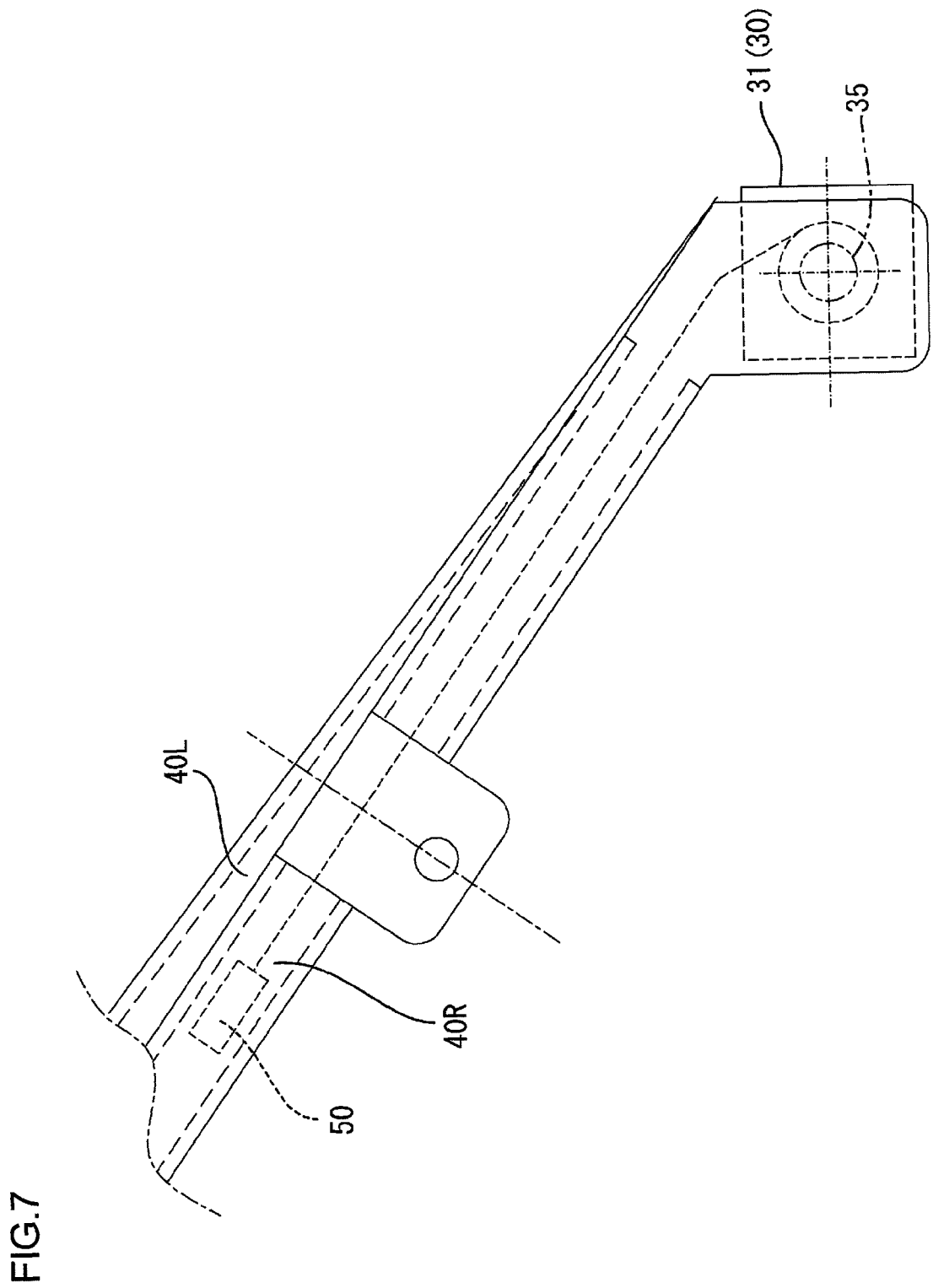
FIG. 7 is a side view showing a dislocated state of positions of the right and left guide rails (showing a comparison example)
Figure 8:
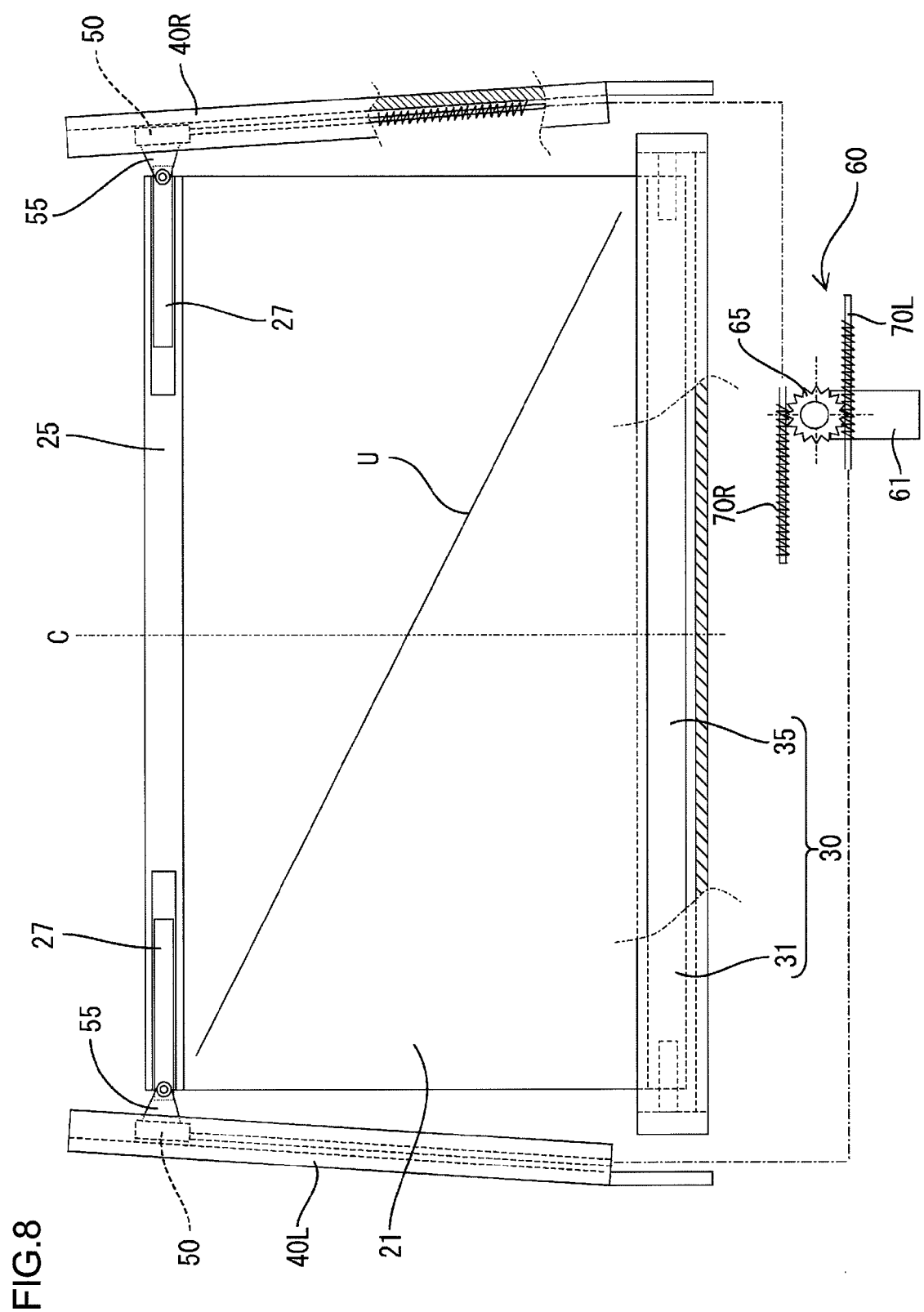
FIG. 8 is an elevation view of the vehicle sunshade device (showing a comparison example)

Here, when no means for restricting the displacement of the relative position is supposedly provided, as shown in FIG. 7, a displacement of the relative distance between the right and left guide rails 40R and 40L may occur when the guide rails 40R and 40L are fixed respectively to the rear pillars 11R and 11L. And so, as shown in FIG. 8, a line U running crossly on the screen body 21 may appear when the screen body 21 is spread out, however, such situation may not occur according to the configuration of Aspect 1.

Aspect 2

Figure 9:
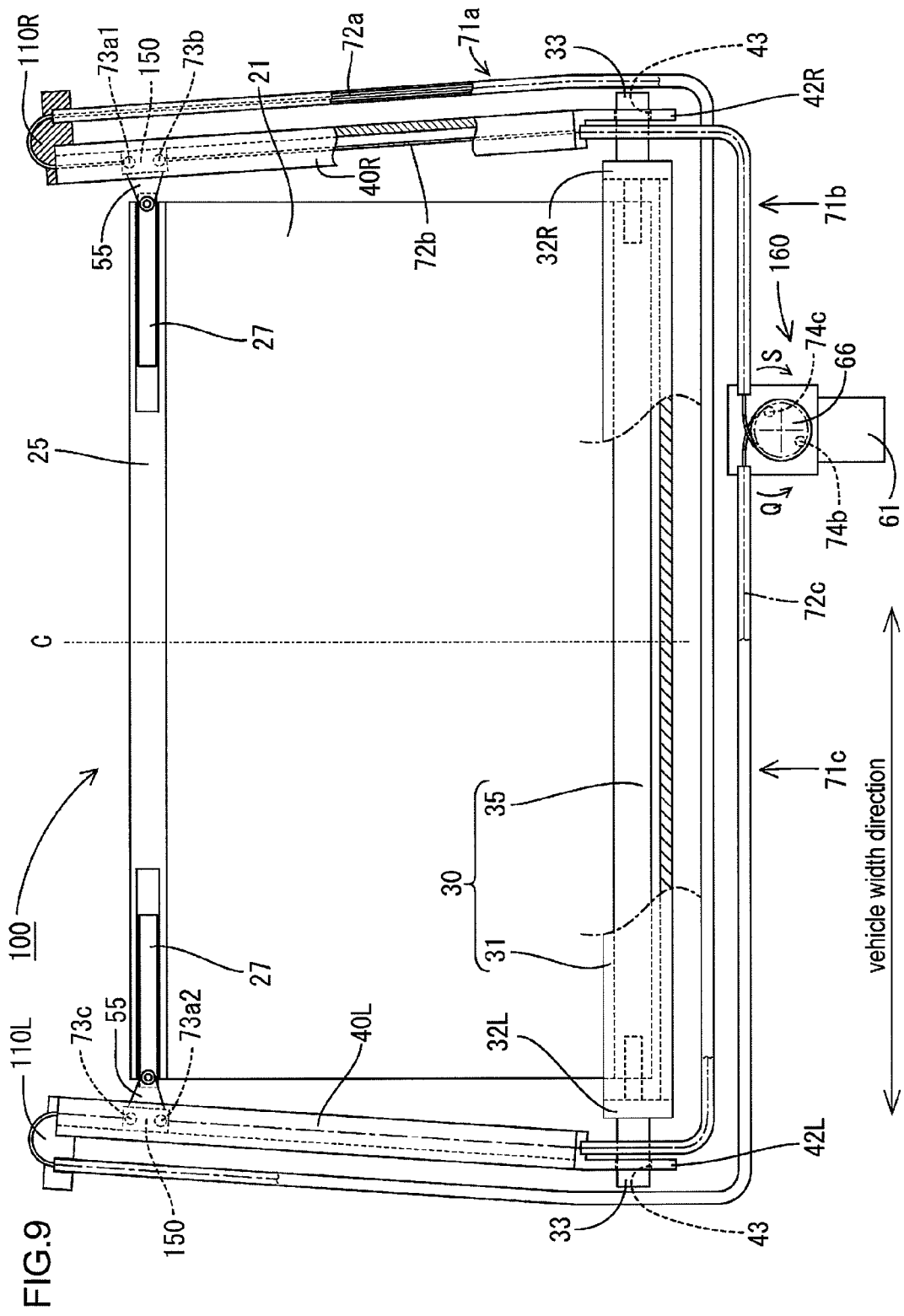
FIG. 9 is an elevation view of the vehicle sunshade device according to Aspect 2 of the present invention.
Figure 10:
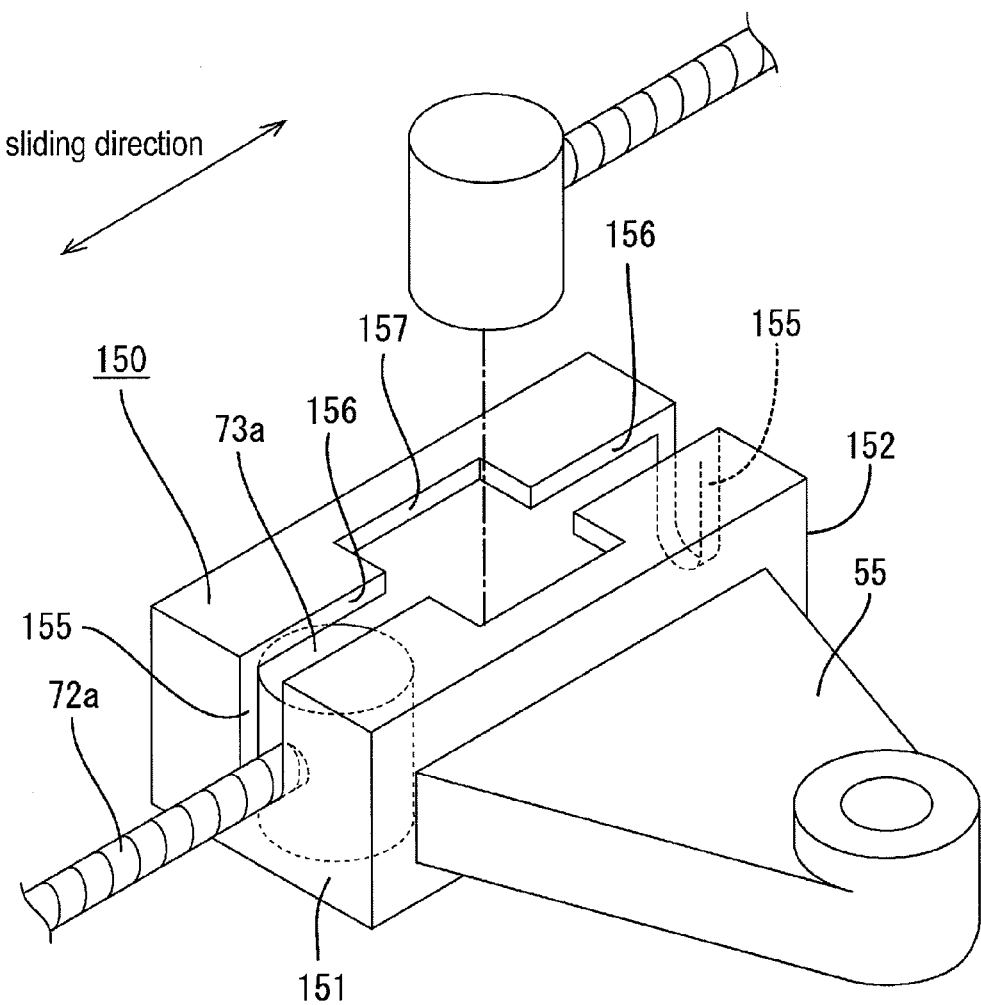
FIG. 10 is a perspective view showing a joint structure of an inner cable to a slider.

As referring now to FIGS. 9 and 10, Aspect 2 of the present invention is described. A vehicle sunshade device 100 in Aspect 2 is what the configuration of the vehicle sunshade device 20 in Aspect 1 has been modified in regards to a slider 150 and a drive unit 160 for reciprocating the slider 150 along the guide rails 40R and 40L. In particular, the drive unit 160 applied in Aspect 2 is comprised from such as: a motor 61, an output pulley 66 connected to a motor shaft not shown, inner cables 72a to 72c, and tubular cable guides 71a to 71c for allowing each inner cable 72a to 72c to be loosely inserted therein.

The inner cables 72a to 72c are made of a deflectable metal made wire rod. The inner cable 72a comprises joint parts 73a1 and 73a2 respectively in its both ends, and one end is joined with the upper part of the slider 150 fitted into the right rail 40R. A turning member 110R having a semicircular turning surface is attached to the upper part of the rail 40R, so that the inner cable 72a pulled-out from the upper surface side of the rail 40R is turned 180 degrees to the outside (the right side in FIG. 9) via this turning member 110R, and pulled down to the lower side along the right rail 40R.

The inner cable 72a pulled out downward is then turned again at the lower side of the rail 40R, and horizontally extending toward the left rail 40L. The inner cable 72a is then pulled into the left rail 40L from the lower surface of the rail, so that the joint part 73a2 at the tip of the inner cable 72a is joined with the lower part of the slider 150 fitted into the rail 40L.

In addition, the joint structure of the cable 72a and the slider 150 is as shown in FIG. 10. Briefly described, the slider 150 fitted respectively into the right and left rails 40R and 40L is in a box-shape and has a cavity there inside. This slider 150 has a pulling-out groove 155 of a narrow groove width in its both wall surfaces 151 and 152 in the sliding direction, while having a receiving groove 156 in the wall surface in the upper side as shown in FIG. 10.

The receiving groove 156 extends toward the pulling-out grooves 155 formed in both the wall surfaces 151 and 152, and is interconnected with the pulling-out grooves 155 respectively at its both ends. Formed in the center of this receiving groove 156 is an insertion part 157 having a wide groove width. According to the above, the joint part 73a is constituted so as to be inserted into the insertion part 157 of the slider 150 as being pulled out from the pulling-out groove 155, so that one end of the inner cable 72a can join with the slider 150. Here, joint part 73a collectively means the joint parts 73a1 and 73a2.

The inner cable 72b is provided with a joint part 73b, having the same form as the joint part 73a1 provided in the cable 72a, in its end, and one end is joined with the lower part of the slider 150 fitted into the right rail 40R. The inner cable 72b runs within the right rail 40R and is pulled out from the bottom surface of the rail, with a block 74b in its tip locked in the output pulley 66.

The inner cable 72c is provided with a joint part 73c, having the same form as the joint part 73a2 provided in the cable 72a, in its end, and one end is joined with the upper part of the slider 150 fitted into the left rail 40L. A turning member 110L having a semicircular turning surface is attached to the upper part of the rail 40L, so that the inner cable 72c pulled out from the upper surface side of the rail 40L is turned 180 degrees to the outside (the left side in FIG. 9) via this turning member 110L, and pulled down to the lower side along the left rail 40L.

The inner cable 72c pulled out downward is then turned again at the lower side of the rail 40L, and horizontally extending toward the output pulley 66. The inner cable 72c extending horizontally is locked in the output pulley 66 at a block 74c in its tip.

According to the above, the right and left sliders and the output pulley 66 are circularly interconnected through these three inner cables 72a to 72c. Therefore, when the output pulley 66 is rotated in the normal rotation direction (a direction S in FIG. 9) by the operation of energizing the motor 61, the inner cable 72b is veered out as the cable 72c is simultaneously wound up. Therefore, the right and left sliders 150 move from the lower end side of the rail to the upper end side thereof, within each guide rail 40R and 40L. This allows both the moving sliders 150 to bring the edge frame 25 up, causing the screen body 21 to be pulled out from the winding device 30 and spread out. Accordingly, the rear window W can be covered by the screen body 21.

On the other hand, when the output pulley 66 is rotated in the reverse direction (a direction Q in FIG. 9), the inner cable 72b is wound up, as the inner cable 72c is simultaneously veered out. Therefore, both the right and left sliders 150 move from the upper end side of the rail to the lower end side thereof respectively within each guide rail 40R and 40L. This allows the screen body 21 in a spread-out state to be wound up by the winding device 30, and thereby uncovering the rear window W.

Additionally, the vehicle sunshade device 100 applied in the Aspect 2 is employing the temporary joint part 80 applied in Aspect 1. In particular, the first wall surfaces 42R and 43L having the through-hole 43 are respectively provided in each guide rail 40R and 40L. On the other hand, the second wall surfaces 32R and 32L having the insertion shaft 33 are respectively provided in both shaft ends of the casing 31. Each insertion shaft 33 in the second wall surfaces 32R and 32L is inserted into each through-hole 43 in the first wall surfaces 42R and 42L, so that both guide rails 40R and 40L are temporarily joined with the casing 31. In addition, the parts in Aspect 2 which are shared with Aspect 1 are allotted with the same symbols.

Aspect 3

The vehicle sunshade device 200 in Aspect 3 is what the configuration of the temporary joint part in the vehicle sunshade device 100 in Aspect 2 has been modified. In short, a temporary joint part 280 in Aspect 3 is composed of second wall surfaces 205R and 205L having a boss 220 and first wall surfaces 142R and 142L having a boss groove 143.

In what follows, as referring now to FIGS. 11 to 14, the concrete configuration of Aspect 3 of the present invention is described. For the vehicle sunshade device 200 according to Aspect 3 has a symmetrical shape, only the left half thereof is shown in the FIGS. 11 to 14. Also, the parts in Aspect 3 which are shared with Aspects 1 and 2 are allotted with the same symbols.

Figure 11:
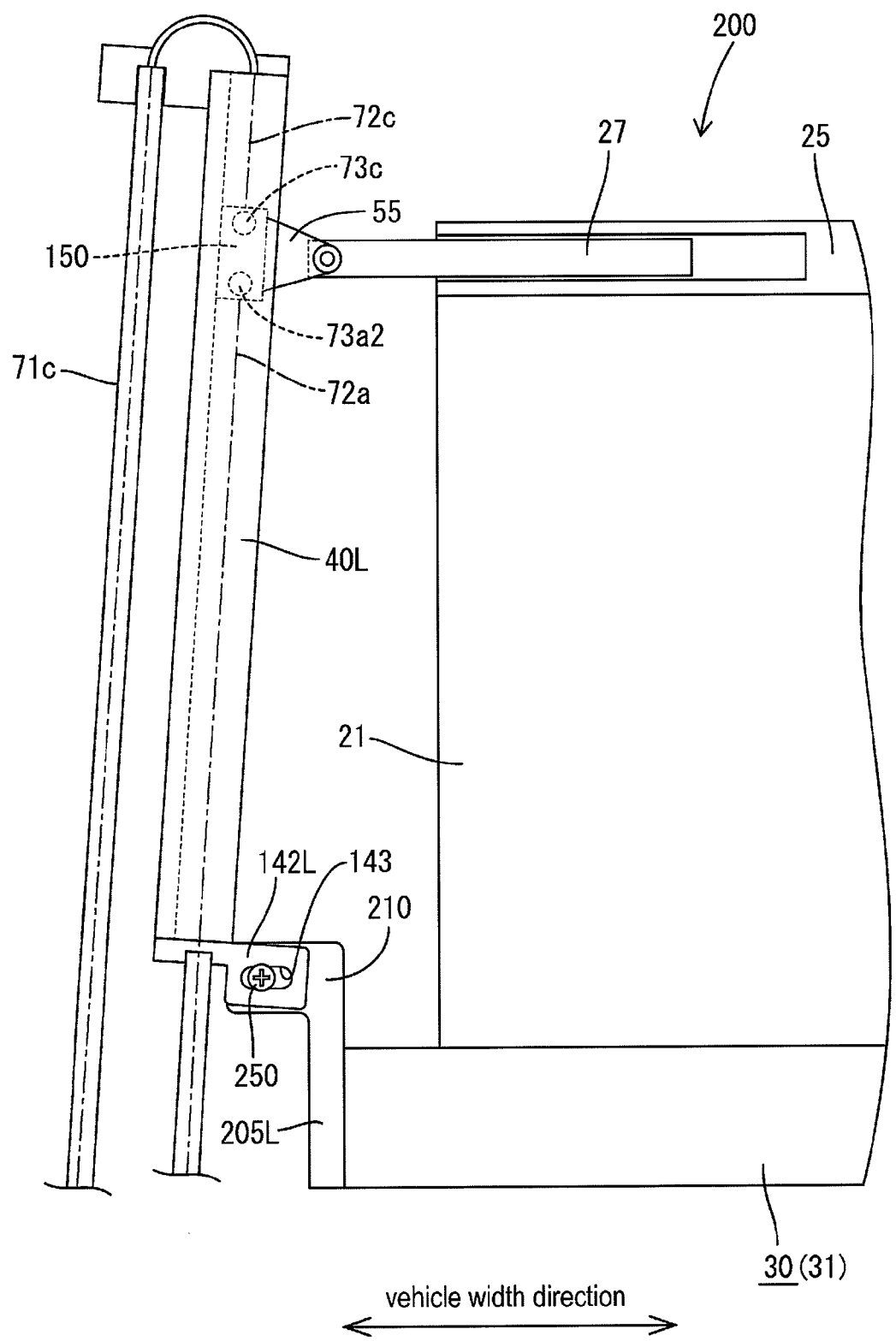
FIG. 11 is an elevation view of the vehicle sunshade device according to Aspect 3 of the present invention (showing only the half of the left side)

As shown in FIG. 11, a second wall surface 205L is provided in the left shaft end of the casing 31 composing the winding device 30. In the upper part of this second wall surface 205L, an overhanging part 210 is integrally formed. The overhanging part 210 is overhanging horizontally and outwardly in the vehicle width direction (the leftward in FIG. 11), while in the vertical direction, positioned in the lower part of the guide rail 40L.

On the other hand, a first wall surface 142L is attached to the lower part of the guide rail 40L. The first wall surface 142L is composed of a bracket as a member separated from the guide rail 40L. This first wall surface 142L is protruding inward in the vehicle width direction (the rightward in FIG. 11) from the lower part of the guide rail 40L, and has a size capable of generally overlapping the overhanging part 210 of the second wall surface 205L.

Figure 12:
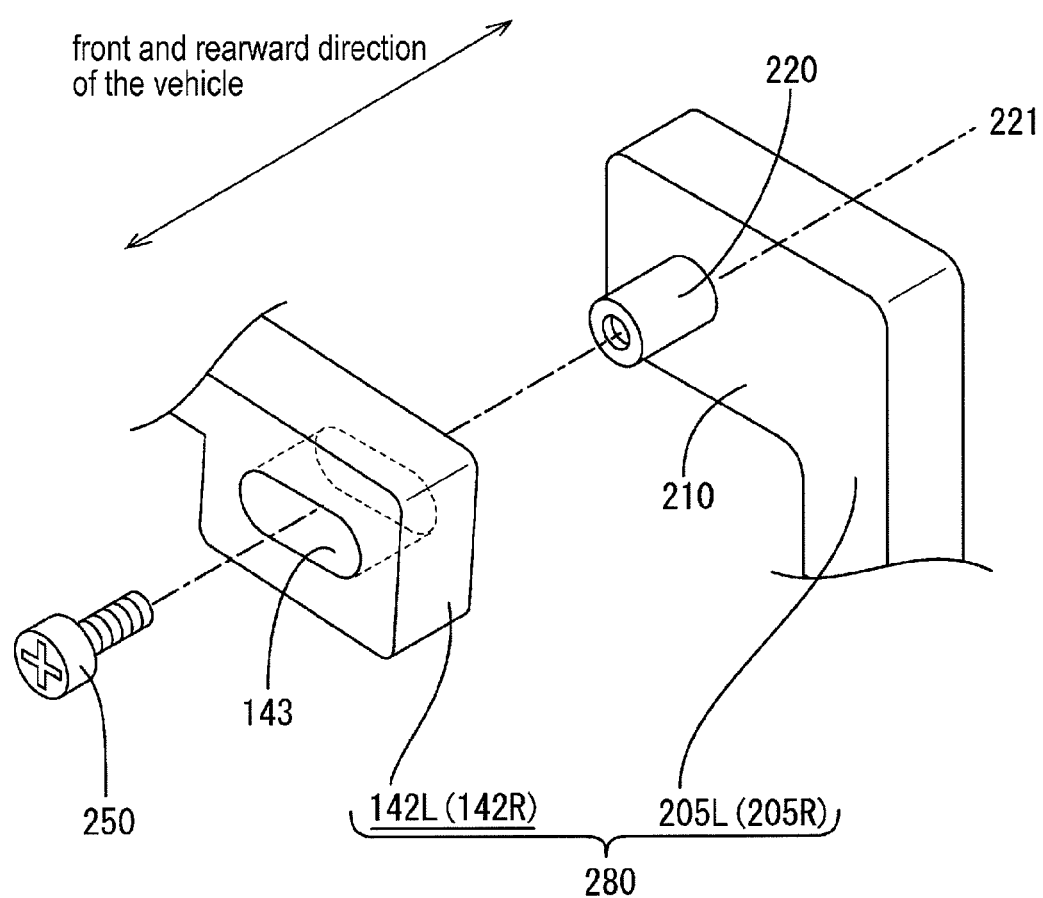
FIG. 12 is a perspective view showing a constitution of the temporary joint part.

As illustrated in FIG. 12, the columnar boss 220, with its axis 221 directed in the front and rearward direction of the vehicle, is formed in the position close to the tip of the overhanging part 210 in the second wall surface 205L. On the other hand, the boss groove 143 for the insertion of the boss 220 is formed in the first wall surface 142L. To overlap the overhanging part 210 in the first wall surface 205L with the second wall surface 142L in the side of the guide rail 40L, while tightening the screw 250 to the tip of the boss 220 inserted into the boss groove 143, so that the guide rail 40L can be temporarily joined with the left shaft end of the casing 31 of the winding device 30.

As shown in FIG. 11, the boss groove 143 has an elongated hole long in the vehicle width direction, and thus the boss 220 can move in the vehicle width direction along this boss groove 143 even after their temporary joint. Even after the temporary joint, the guide rail 40L can therefore move in the vehicle width direction along the elongated hole. And also, the guide rail 40R is also constituted so as to be temporarily joined with the right shaft end of the casing by means of the temporary joint part 280 having a configuration same as the above. Accordingly, similar to the temporary joint part 80 in Aspects 1 and 2, the temporary joint part 280 in Aspect 3 also has a mechanism which allows the relative distance between the guide rails 40R and 40L to be adjusted accordingly even after the temporary joint.

Figure 13:
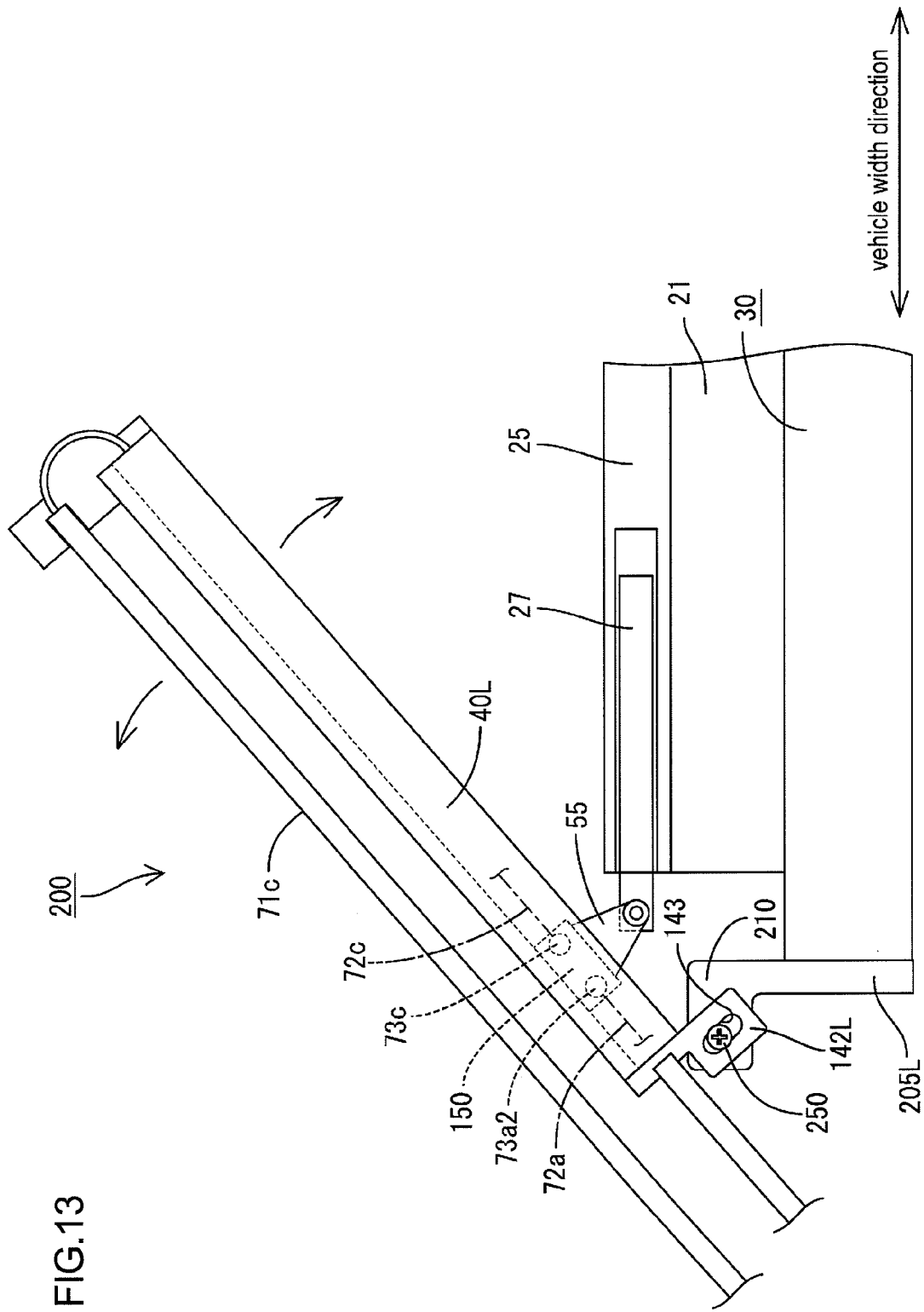
FIG. 13 is an elevation view of the vehicle sunshade device showing the folding process of the guide rails.
Figure 14:
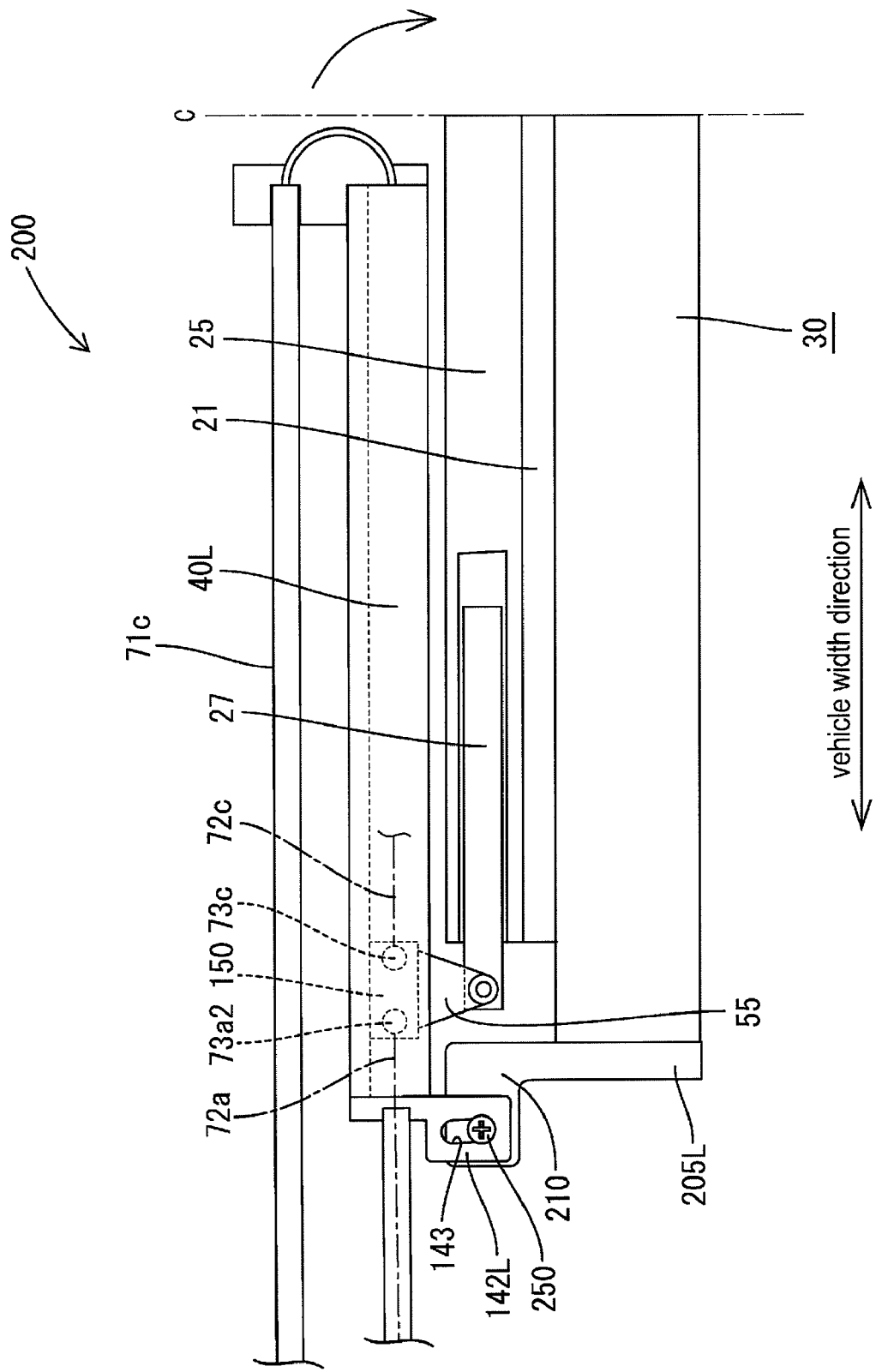
FIG. 14 is an elevation view of the vehicle sunshade device showing a folded state of the guide rails.

In addition, according to the configuration of Aspect 3, the entire first wall surface 142L and even the guide rail 40L can be rotated about the axis 221 of the boss 220, on a plane surface orthogonal to the axis 221. As illustrated in FIGS. 13 and 14, both right and left guide rails 40R and 40L can therefore be folded, overlapping the casing 31. Accordingly, this configuration is space-saving, and thus superior in maintenance and handling, when storing the manufactured vehicle sunshade device 200 before shipment, and transporting it for delivery.

In addition, it is preferred to have the external diameter of the boss 220 and the groove width (minor diameter) of the boss groove 143 be approximately the same, and furthermore, to have the height of the boss 220 and the thickness of the boss groove 143 be the same. If so, due to the fitting action between the boss 220 and the boss groove 143, the first wall surfaces 142R and 142L in the side of the guide rails 40R and 40L are restricted to move in the front and rearward direction of the vehicle by the overhanging part 210 in the casing 31 side, so that, similar to Aspects 1 and 2, both right and left guide rails 40R and 40L can be in a rotation preventive state (prevented from rotating in the front and rearward direction of the vehicle) relative to the casing 31.

With embodiments of the present invention described above with reference to the accompanying drawings, it is to be understood that the invention is not limited to those precise embodiments, and the embodiments as below, for example, can be within the scope of the present invention.

Figure 15:
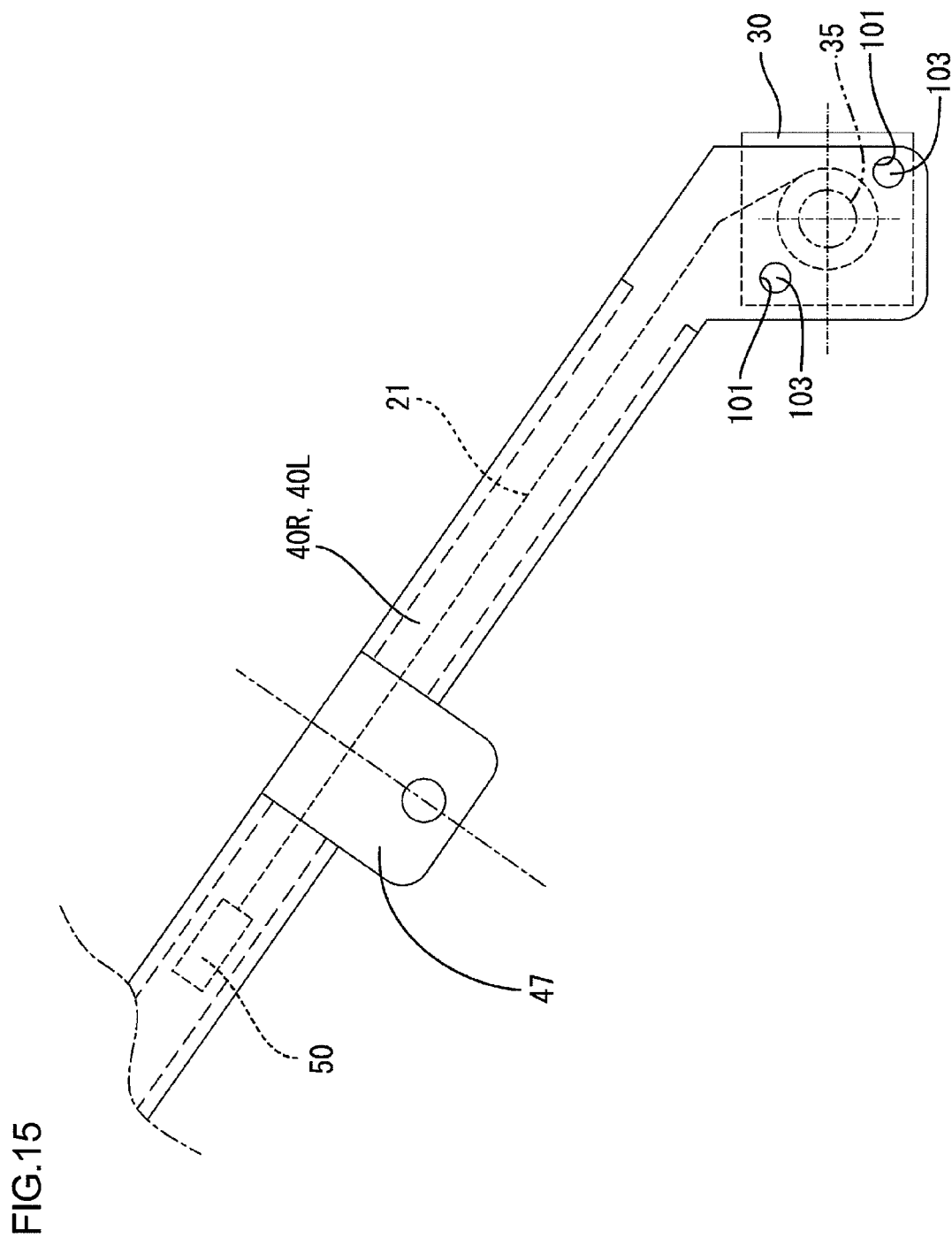
FIG. 15 is a view showing another aspect of the present invention.

(1) In Aspects 1 and 2, both the hole shape of the through-hole 43 and the cross-sectional shape of the insertion shaft 33 are rectangular, however, the prevent invention is not limited to this, and any multangular shapes other than a rectangular shape may prevent the right and left guide rails 40R and 40L from rotating relative to the casing 31 of the winding device 30. In addition, the hole shape of the through-hole 43 and the cross-sectional shape of the insertion shaft 33 may be circular. When these shapes are circular, as shown in FIG. 15, a plurality (two sets in FIG. 15) of sets of a through-holes 101 and insertion shafts 103 may be provided so that, similar to the above cases in Aspects 1 and 2, the right and left guide rails 40R and 40L can be effectively prevented from rotating relative to the casing 31 of the winding device 30.

(2) In Aspects 1 and 2, the temporary joint part 80 is illustrated by examples where, among the pair of the through-hole 43 and the insertion shaft 33, the through-hole 43 is provided in the first wall surfaces 42R and 42L in the side of the guide rails 40R and 40L, while the insertion shaft 33 is provided in the second wall surfaces 32R and 32L in the side of the winding device 30. However, the temporary joint part 80 is not limited to the illustrated constitution, and may be reversely constituted so that the through-hole 43 is provided in the second wall surfaces 32R and 32L in the side of the winding device 30, while the insertion shaft 33 is provided in the first wall surfaces 42R and 42L in the side of the guide rails 40R and 40L.

(3) In the above Aspect 3, the temporary joint part 280 is illustrated by example where, among the pair of the boss 220 and the boss groove 143, the boss 220 is provided in the second wall surfaces 205R and 205L in the side of the casing 31, while the boss groove 143 is provided in the first wall surfaces 142R and 142L in the side of the guide rail 40. However, the temporary joint part 280 is not limited to the illustrated constitution, and may be reversely constituted so that the boss 220 is provided in the first wall surfaces 142R and 142L in the side of the guide rails 40R and 40L, while the boss groove 143 is provided in the second wall surfaces 205R and 205L in the side of the casing 31.

What is claimed is:

1. A vehicle sunshade device to be attached to a pair of rear pillars formed in both sides in a vehicle width direction so as to cover a rear window with a screen body comprising:
a winding device configured to bias the screen body in a winding-up direction;
a pair of guide rails in both sides in the vehicle width direction of the winding device, and being attachable to an inner wall of each rear pillar;
a pair of sliders fixed at both edges in the vehicle width direction of the screen body respectively, and reciprocally movable within the guide rails;
a drive unit configured to reciprocally move the sliders within the guide rails, so as to spread out the screen body against a biasing force of the winding device and wind up the screen body in a spread-out state with the winding device; and
a temporary joint part temporarily connecting the guide rails with the winding device such that a relative distance between the guide rails is adjustable, the temporary joint part connecting the guide rails with the winding device until the vehicle sunshade device is attached to the rear pillars,
wherein the temporary joint part includes insertion shafts projecting from the winding device in the vehicle width direction, and through holes formed in the guide rails with depths extending in the vehicle width direction and in which the insertion shafts are inserted.

2. The vehicle sunshade device according to claim 1, wherein the winding device comprises a winding shaft for biasing the screen body in the winding-up direction and a supporting member for supporting shaft ends of the winding shaft, and
wherein, the temporary joint part comprises:
a first wall surface provided in a lower part of each guide rail and having one of the through holes; and
a second wall surface provided in each shaft end of the supporting member and having one of the insertion shafts.

3. The vehicle sunshade device according to claim 2, wherein both a hole shape of each through hole and a cross-sectional shape of each insertion shaft are multi-angular, so that, at the time of the temporary joint, the guide rails are prevented from rotating relative to the supporting member.

4. A vehicle sunshade device to be attached to a pair of rear pillars formed in both sides in a vehicle width direction so as to cover a rear window with a screen body, and comprising:
a winding device configured to bias the screen body in a winding-up direction;
a pair of guide rails in both sides in the vehicle width direction of the winding device, and being attachable to an inner wall of each rear pillar;
a pair of sliders fixed at both edges in the vehicle width direction of the screen body respectively, and reciprocally movable within the guide rails;
a drive unit configured to reciprocally move the sliders within the guide rails, so as to spread out the screen body against a biasing force of the winding device and wind up the screen body in a spread-out state with the winding device; and
a temporary joint part temporarily connecting the guide rails with the winding device such that a relative distance between the guide rails is adjustable, the temporary joint part connecting the guide rails with the winding device until the vehicle sunshade device is attached to the rear pillars,
wherein the winding device comprises a winding shaft for biasing the screen body in the winding-up direction and a supporting member for supporting shaft ends of the winding shaft, and
wherein the temporary joint part comprises:
a first wall surface provided in a lower part of each guide rail, and having one of a columnar boss formed with an axis directed in a front and rearward direction of the vehicle, and a boss groove having an elongated hole shape that is long in the vehicle width direction; and
a second wall surface provided in each shaft end of the supporting member, and having the other one of the columnar boss and the boss groove.

5. A vehicle sunshade device to be attached to a pair of rear pillars formed in both sides in a vehicle width direction so as to cover a rear window with a screen body, comprising:
a winding device configured to bias the screen body in a winding-up direction;
a pair of guide rails in both sides in the vehicle width direction of the winding device, and being attachable to an inner wall of each rear pillar;
a pair of sliders fixed at both edges in the vehicle width direction of the screen body respectively, and reciprocally movable within the guide rails;
a drive unit configured to reciprocally move the sliders within the guide rails, so as to spread out the screen body against a biasing force of the winding device and wind up the screen body in a spread-out state with the winding device; and
a temporary joint part temporarily connecting the guide rails with the winding device such that a relative distance between the guide rails is adjustable, the temporary joint part connecting the guide rails with the winding device until the vehicle sunshade device is attached to the rear pillars,
wherein the temporary joint part includes insertion shafts that are insertable into the guide rails in the vehicle width direction and project from the guide rails in the vehicle width direction, and through holes formed in the winding device with depths extending in the vehicle width direction and in which the insertion shafts are fitted.

6. The vehicle sunshade device according to claim 5, wherein the winding device comprises a winding shaft for biasing the screen body in the winding-up direction and a supporting member for supporting shaft ends of the winding shaft, and
wherein, the temporary joint part comprises:
a first wall surface provided in a lower part of each guide rail and having one of the insertion shafts; and
a second wall surface provided in each shaft end of the supporting member and having one of the through holes.

7. The vehicle sunshade device according to claim 6, wherein both a hole shape of each through hole and a cross-sectional shape of each insertion shaft are multi-angular, so that, at the time of the temporary joint, the guide rails are prevented from rotating relative to the supporting member.

* * * * *